(12) United States Patent
Merswolke et al.

(10) Patent No.: US 6,672,054 B2
(45) Date of Patent: Jan. 6, 2004

(54) WIND POWERED HYDROELECTRIC POWER PLANT AND METHOD OF OPERATION THEREOF

(75) Inventors: Paul H. F. Merswolke, Bogner (CA); Thomas B. Gardner, Kitchener (CA)

(73) Assignee: New World Generation Inc., Owen Sound (CA)

(*) Notice: Subject to any disclaimer, the term of this patent is extended or adjusted under 35 U.S.C. 154(b) by 107 days.

(21) Appl. No.: 09/988,643

(22) Filed: Nov. 20, 2001

(65) Prior Publication Data

US 2002/0144503 A1 Oct. 10, 2002

Related U.S. Application Data

(60) Provisional application No. 60/282,500, filed on Apr. 10, 2001.

(51) Int. Cl.[7] ............................................. F16D 31/02
(52) U.S. Cl. ........................................ 60/398; 91/4 R
(58) Field of Search ...................... 60/398, 418; 91/4 R; 417/334; 290/44, 55

(56) References Cited

U.S. PATENT DOCUMENTS

| | | | | |
|---|---|---|---|---|
| 1,247,520 A | * | 11/1917 | Fessenden | 60/398 |
| 2,539,862 A | * | 1/1951 | Rushing | 60/398 |
| 3,100,965 A | * | 8/1963 | Blackburn | 91/4 R |
| 4,055,950 A | * | 11/1977 | Grossman | 60/398 |
| 4,206,608 A | * | 6/1980 | Bell | 60/398 |
| 4,426,846 A | * | 1/1984 | Bailey | 60/398 |
| 6,149,246 A | * | 11/2000 | Terborn et al. | 303/7 |
| 6,363,718 B1 | * | 4/2002 | Shu | 60/398 |

* cited by examiner

Primary Examiner—Edward K. Look
Assistant Examiner—Michael Leslie
(74) Attorney, Agent, or Firm—Daryl W. Schnurr (57) ABSTRACT

A hydroelectric power plant uses a plurality of windmills connected to compressed air generators to produce pressurized air. Pressurized air is used to drive water through a turbine to produce electrical power. The water is recycled and the power plant includes reserve pressurized air tanks to allow the plant to continue to operate when the wind levels are not sufficient to produce high pressure air. The power plant is designed to be operated on a continuous basis based on wind power. When the wind subsides and the reserve capacity has been exhausted, electricity can be drawn from the local utility supplier. When excess power is generated by the power plant, electricity from the power plant can be added to the grid of the local electricity supplier.

32 Claims, 6 Drawing Sheets

WIND POWERED HYDROELECTRIC POWER PLANT AND METHOD OF OPERATION THEREOF

This application claims the benefit of Provisional Application No. 60/282,500, filed Apr. 10, 2001.

BACKGROUND OF THE INVENTION

1. Field of the Invention

This invention relates to a wind powered hydro-electric power plant and a method of operation thereof. More particularly, this invention relates to a hydroelectric power plant where water is forced through a turbine by high pressure air produced by wind energy and a method of operation thereof.

2. Description of the Prior Art

It is known to have windmills connected to compressed air generators to produce pressurized air. It is also known to have windmills that are used to produce electricity with battery packs as back up to produce electricity when the wind is not blowing. The battery packs are charged by the electrical generators connected to the windmills. When the wind stops blowing the battery packs run out of electrical power too quickly. Also, when the batteries in the battery pack have been charged and discharged a number of times, the batteries must be replaced at great expense. Windmills can generate electricity simply by having an electrical generator connected directly to a windmill. Windmills connected to electrical generators cannot consistently produce 60 cycle electricity because of the variation in the speed of the windmills. Without 60 cycle electricity, previous windmill/electricity systems cannot be connected into a grid system of an electrical utility.

Current windmill systems that generate electricity through an electrical generator have a disadvantage in that no electricity is generated by the windmills when the wind is not blowing. Further, existing windmill systems do not store sufficient energy created when the wind is blowing where that energy can be used to generate electricity when the wind is not blowing. Still further, battery packs can be very expensive and they do not store energy for a sufficiently long time. Also, battery packs can lose their capacity for recharging and then must be replaced.

SUMMARY OF THE INVENTION

It is an object of the present invention to provide a hydroelectric power plant using windmills to provide the energy to generate electricity. It is a further object to provide a hydroelectric power plant having a reserve to generate electricity when the wind is not blowing. It is still a further object of the present invention to provide a method of operation of a hydroelectric power plant based on wind energy and storing excess energy created when the wind is blowing for use when the wind is not blowing.

A hydroelectric power plant has a plurality of windmills connected to compressed air generators to provide pressurized air to a set of liquid storage tanks. Each storage tank has a high pressure water outlet, a water inlet and an air inlet and air outlet. The water outlet of each storage tank is connected to a water inlet of a turbine that generates electricity when water passes through it. The turbine has a water outlet and an electrical power outlet. The turbine water outlet is connected to a recycle line that is in turn connected to the water inlets of the storage tanks. Control means is connected to control the transfer and distribution of pressurized air to the storage tanks, to control the flow of high pressure water from the storage tanks to the turbine, and to control the recycling of water from the water outlet of the turbine to the water inlet of the storage tanks. The electrical power outlet of the turbine is connected to a power line.

Preferably, the power plant has a high pressure air reserve system to store high pressure air for use when wind velocities are not sufficient to operate the plant. The air reserve system has an air inlet and an air outlet. The control means produce electricity when the wind is not sufficiently strong to operate the plant.

A method of operating a hydroelectric power plant using compressed air obtained from a plurality of windmills connected to compressed air generators, said plant having storage tanks and high pressure air reserve tanks, said method comprising producing pressurized air when the wind is blowing to operate compressed air generators connected to windmills, introducing the pressurized air into a plurality of storage tanks that are nearly filled with water. Storing excess compressed air produced by the windmills when the wind is blowing in high pressure reserve air tanks, controlling the water outlet valves from each of the storage tanks to release high pressure water into an outlet line connected to the water inlet of a turbine, causing the water to flow into the turbine through the water inlet and out of the water outlet of the turbine, thereby generating electricity, bleeding the pressurized air within those storage tank that have been substantially emptied of water to the air reserve tanks, pumping the water from the water outlet of the turbine back into the substantially empty storage tanks, returning the high pressure air that has been bled from the nearly empty storage tanks back to the water filled storage tanks, supplementing the air pressure within the storage tanks with high pressure air from the reserve air tanks or with high pressure air generated by the wind mills if required, and causing the electricity generated by the turbine to flow into a power line.

Preferably, the power line is connected to a service line of an electrical utility and flow of electricity is controlled by an electrical transfer controller so that when the electrical power plant generates excess electricity in the power line, electricity can flow through the transfer controller into a grid of the electrical utility and when the electrical power plant does not generate sufficient electricity, electricity is connected to control the flow of high pressure air to and from the air reserve system.

Still more preferably, where the climatic conditions are such that the water used in the power plant could freeze, anti-freeze is added to the water to lower the freezing temperature.

Further, anti-coagulant is preferably added to the water.

DESCRIPTION OF A PREFERRED EMBODIMENT

Figure 1:
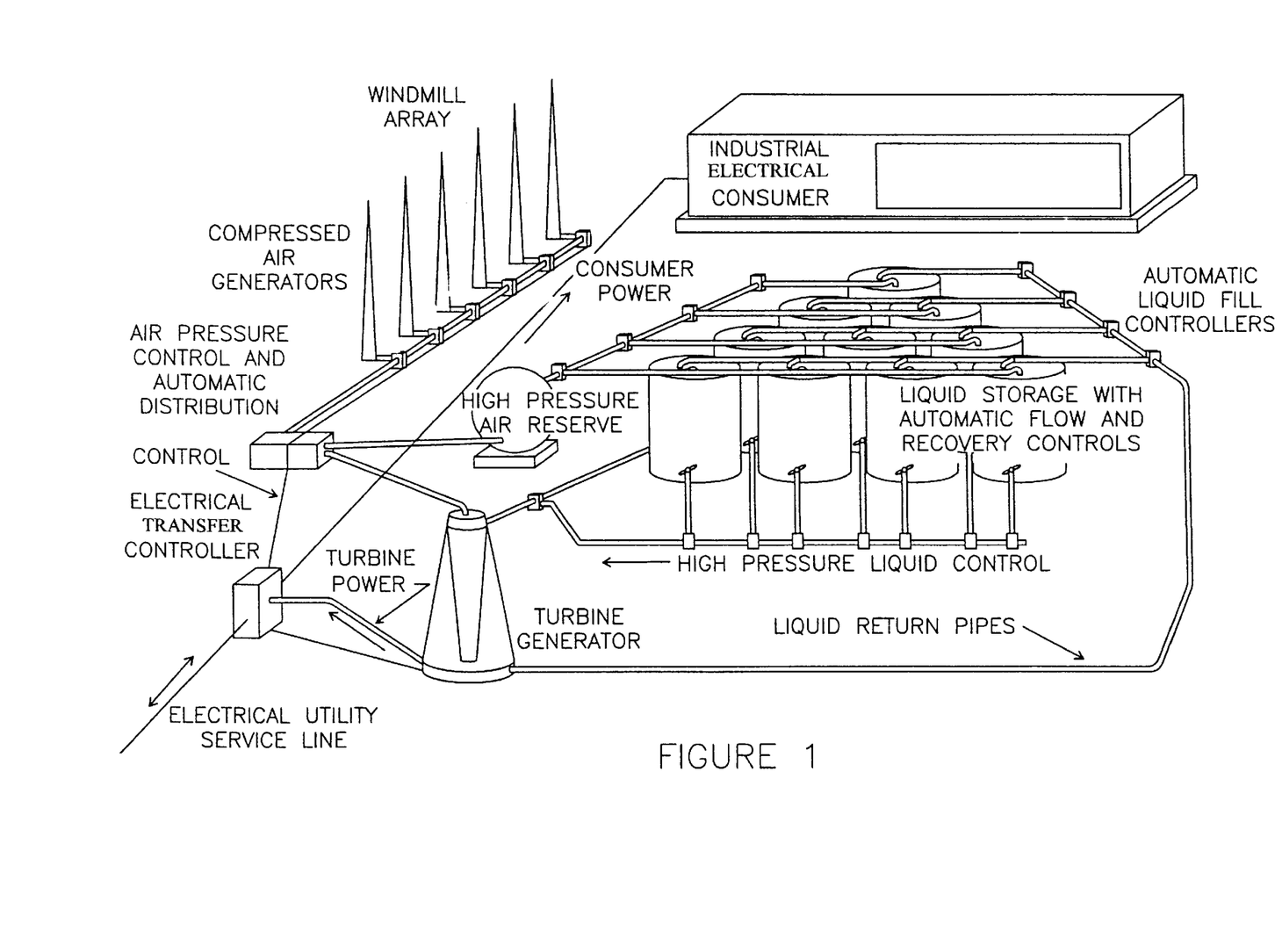
FIG. 1 is a schematic flow chart of a power plant.

In FIG. 1, there is shown a windmill array representing a plurality of windmills. The windmills are each connected to a compressed air generator. The compressed air generators are connected to an air pressure control and automatic distribution device that transfers pressurized air to a high pressure air reserve system or directly to a plurality of liquid storage tanks that are substantially filled with water (except in very cold weather climates where anti-freeze must be added to the water to ensure that it does not freeze). The high pressure air reserve system is a series of air storage tanks. Each of the compressed air generators has an air dryer to dry the compressed air produced by the air generator. Other air dryers are located in the hydroelectric power plant as required. After the water has been placed in the liquid storage tanks, high pressure air is introduced into the top of the liquid storage tanks either from the high pressure air reserve system or directly from the air pressure control and automatic distribution device. The liquid storage tanks have a water outlet valve located so that the water can be emptied from each of the liquid storage tanks from the pressure created by the high pressure air when the water outlet valve has been opened. Preferably, the water outlet valve for each of the liquid storage tanks is located along a collector line where the valves can be controlled to provide a continuous volume of water to the water inlet of the turbine.

An automatic air release is located at the top of the turbine to return any buildup of air in the turbine to the air pressure control and automatic distribution device. Preferably, a feed to the turbine channels the water received through the water inlet of the turbine. Preferably, the water inlet has an interior channel in the shape of a vortex to take advantage of the vortex force of feeding water to the electricity generator of the turbine. The supply of water from the liquid storage tanks is controlled by the liquid controllers in the collector line so that each liquid storage tank is emptied in succession.

After the water has flowed through the turbine to generate electricity, the water flows through a water outlet from the turbine through a recycle line back to automated liquid fill controllers. The liquid fill controllers coordinate the refilling of the liquid storage tanks in the same order in which the storage tanks were emptied. In other words, the storage tank that was emptied first will be refilled first. Prior to any refilling, any high pressure air remaining in a substantially empty storage tank is transferred out of that storage tank into one of the high pressure air reserve tanks. After that liquid storage tank has been substantially refilled with water, high pressure air from the air reserve system or directly from the air pressure control and automatic distribution device is transferred into that tank above the water level. That tank has thus been recharged with water and high pressure air and is ready to be emptied. The remaining tanks are similarly depressurized, refilled and recharged with high pressure air in succession.

The method whereby the tanks are emptied and water under pressure flows into the water inlet of the water turbine is then repeated. Electrical power generated by the turbine flows from the turbine to an electrical transfer controller. Preferably, the electrical transfer controller is connected into an electrical utility service line through which electricity can flow through the electrical transfer controller into the electrical utility grid system when the plant is generating electricity that is excess to the needs of the plant. Alternatively, where the hydroelectric power plant is not generating any electrical power or is not generating sufficient electrical power because the wind has not blown at a sufficient velocity for some time and there is no high pressure air available or insufficient high pressure air available within the system to empty water from the water storage tanks into the turbine, electricity will flow from the electrical grid system through the transfer controller into the power line to fill the needs of consumers of the plant.

The electrical transfer controller is connected to an electrical consumer such as an industrial plant. The electrical transfer controller controls the flow of electricity from the electrical utility service line (or utility grid system) to the electrical consumer when the hydroelectric power plant of the present invention is not producing enough electricity for the consumer. When the hydroelectric power plant is producing more electrical power than the consumer requires for its immediate needs, the electrical transfer controller transfers electricity into the electrical utility grid system (i.e. municipal power system, not shown) through the electrical utility service line. In other words, if the hydroelectric power plant of the present invention does not generate sufficient electrical power at any time, to service the needs of the electrical consumer of the power plant of the present invention, the needs of the electrical consumer are met by the municipal power system. When more than enough electrical power is generated by the hydroelectric power plant than is required by the electrical consumer, electrical power is transferred into the municipal power system. Arrangements can be made with the municipal power system to receive and distribute this power and also to pay for the power received from the hydroelectric power plant.

The hydroelectric power plant of the present invention can be established physically close to the electrical consumer or consumers that the power plant is designed to service, thereby eliminating power losses caused by transferring electrical power over long distances.

The air pressure control and automatic distribution device is connected to the turbine to add high pressure air to the turbine or to automatically release high pressure air from the turbine if the desired levels are exceeded. The high pressure air in the turbine forces the water through the turbine, thereby generating electrical power. Preferably, the controllers and valves are controlled by one or more computers.

Figure 2:
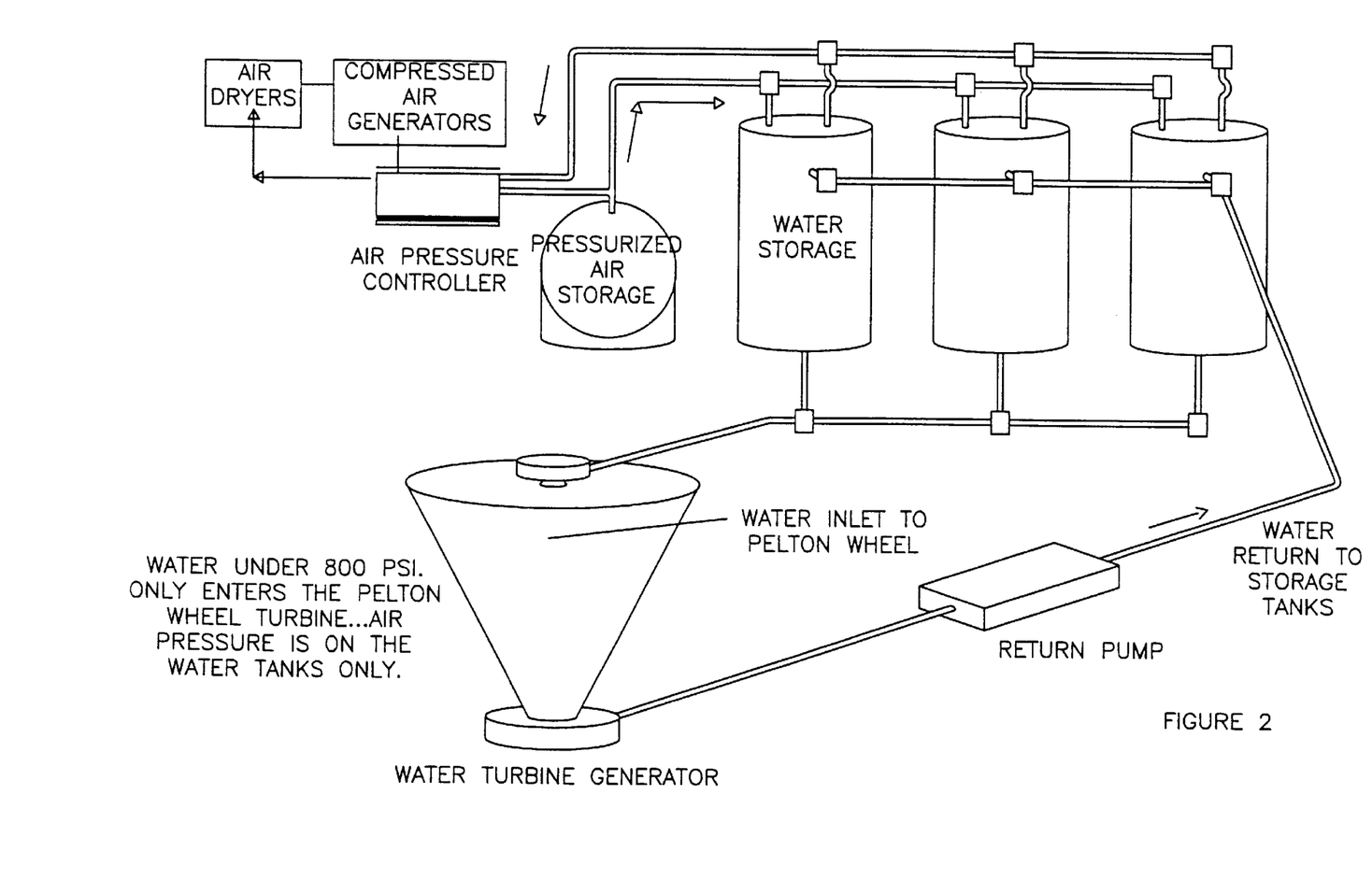
FIG. 2 is a partial schematic view of the power plant.

In FIG. 2, there is shown schematic enlarged view of part of the hydroelectric plant. It can be seen that there is a pump located in the water recycle line. The air cushion within the turbine feed maintains 200 foot pounds of pressure. Other turbines may require more or less pressure to operate properly. It is expected that air pressure substantially 6000 psi can be produced by the air generators powered by high efficiency windmills. The pressure of the air pressure in the air pressure reserve system is much greater than the pressure of the air in the storage tanks that have been pressurized and are ready to supply water to the turbine. Various types and sizes of turbines can be used including a Pelton (a trade mark) wheel. The turbine preferably has a feed that narrows in size from top to bottom.

Figure 3:
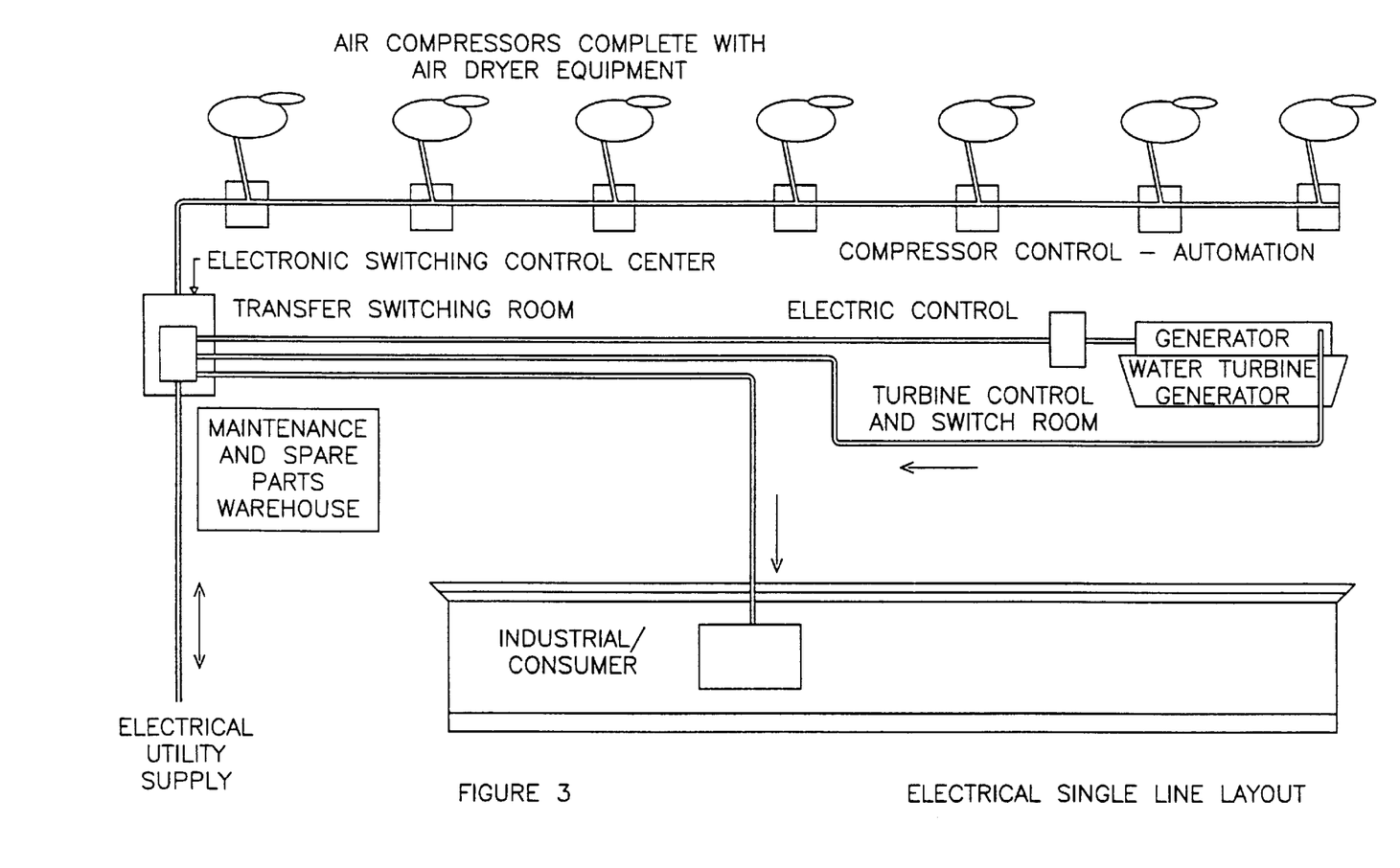
FIG. 3 is a flow diagram of the power plant.

In FIG. 3, there is shown a flow diagram showing the electrical control of the compressed air created by the compressed air generators. In addition, there is shown the electrical power output from the turbine and the distribution of that output to the industrial consumer or to the electrical utility supply through the electrical transfer controller.

Figure 4:
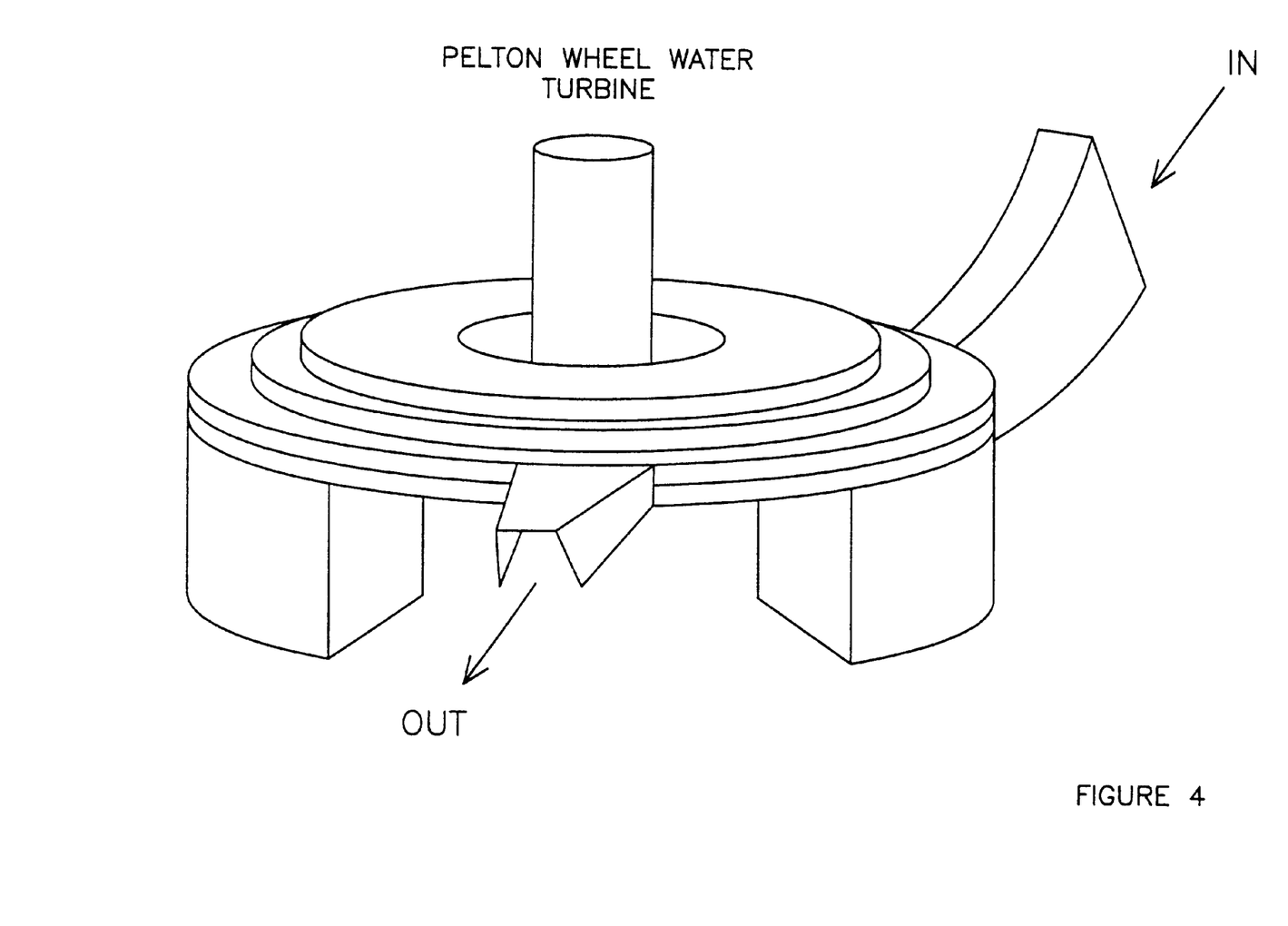
FIG. 4 is a partial perspective schematic view of a hydroelectric turbine.
Figure 5:
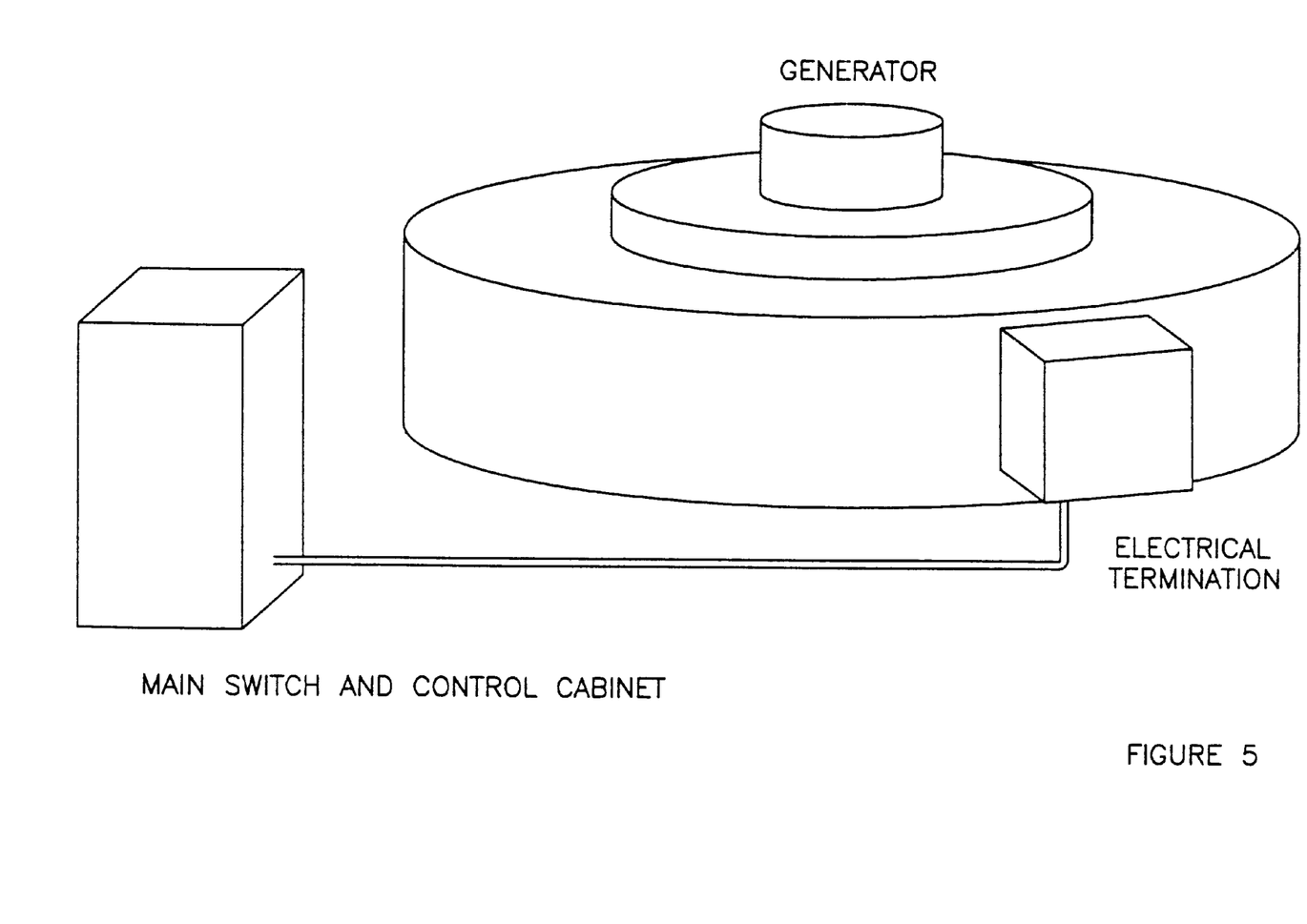
FIG. 5 is a schematic perspective view of a generator of a turbine.

FIGS. 4 and 5 are perspective views of the turbine where water flowing through the turbine causes the fins (not shown) to rotate the rotor about the shaft and against the stator, thereby generating electrical power. The water entering the turbine flows through a series of louvres, which are arranged in a ring around a turbine inlet. The amount of water entering the turbine can be regulated by opening or closing wicket gates as required. Operators can keep the turbine turning at a constant speed even under widely varying electrical loads. Maintaining precise speed is important since it is the rate of rotation that determines the frequency of the electricity produced. The turbine is coupled to an electrical generator by a long shaft. The generator consists of a large spinning rotor and a stationary stator. The outer ring of the rotor is made up of a series of copper wound iron cells or poles, each of which acts as an electrical magnet. The stator is comprised of a series of vertically oriented copper coils nestled in the slots of an iron core. As the rotor rotates, its magnetic field induces a current in the stators windings, thereby generating electricity. The operation of these turbines is conventional and the turbines are therefore not described in further detail. A Pelton wheel is conventional as well. The turbine used in the power plant in the present application operates in the same manner as a turbine in a hydroelectric power plant where water flows through the turbine by gravity (for example, the hydroelectric power plant at Niagara Falls).

Since the water in the hydroelectric power plant of the present invention cannot flow through the turbine and be recycled by gravity, the high pressure air places the water under pressure to cause the water to flow through the system and to simulate water flowing by gravity. Pressure controls ensure that the pressure on the water is maintained substantially constant. The flow of water into the turbine is substantially constant and the turbine therefore rotates at a substantially constant speed. In this way, the turbine can be operated to produce 60 cycle electricity.

Figure 6:
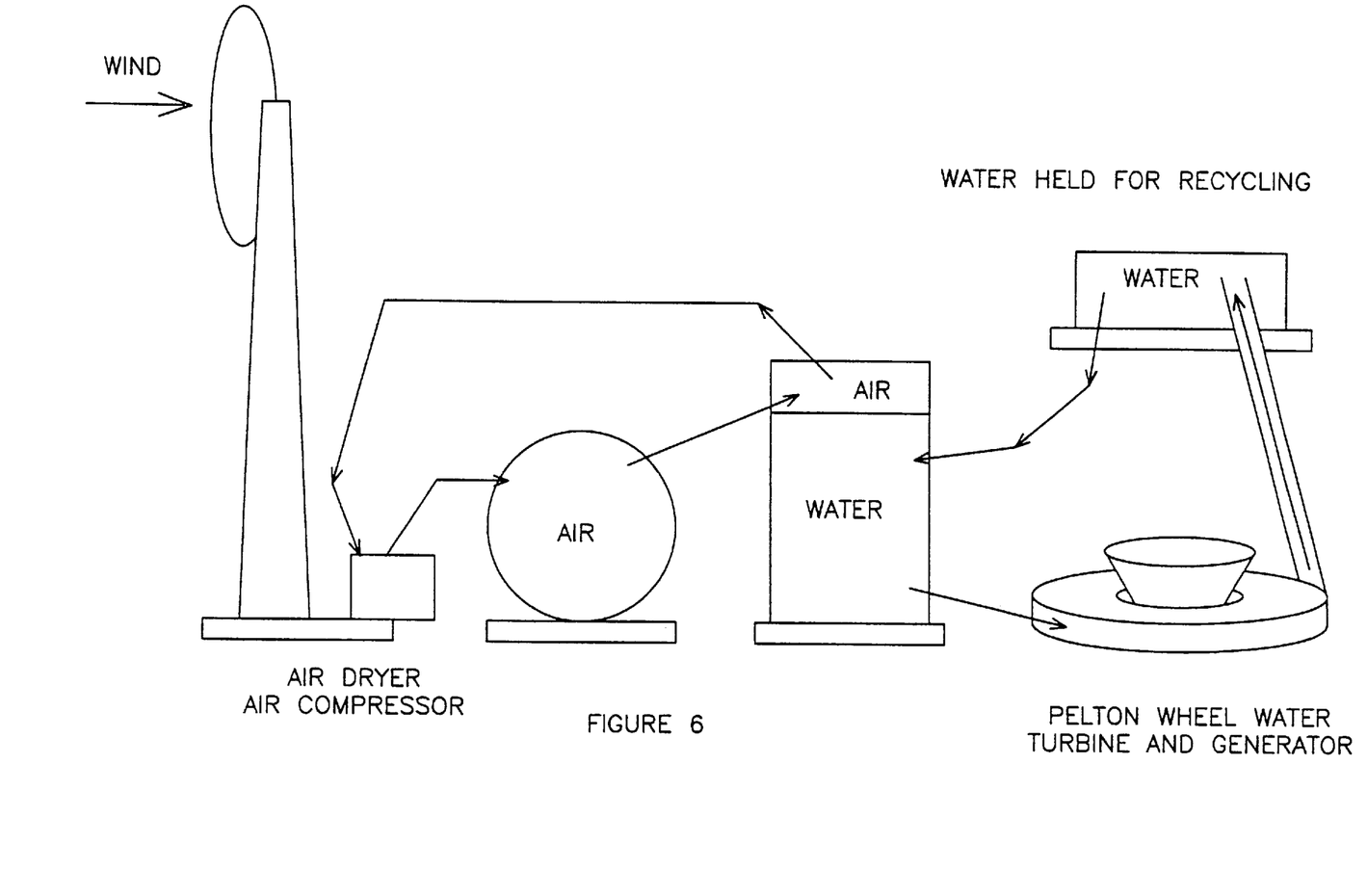
FIG. 6 is a simplified schematic flow chart of a power plant.

In FIG. 6, there is shown a simplified version of the hydroelectric power plant of the present invention and a method of operating that power plant. The device and method of the present invention use the energy generated by the wind with reserves for back up when the wind speed is less than the required levels. While the actual design of the system will contain numerous variations, preferably, the windmill/air generator system will generate 30% greater capacity than the anticipated level of consumption. In addition, extra units should be included in the desire to allow for periodic shut downs for maintenance purposes. The reserve air pressure tanks will allow the system to continue to operate to generate electricity when the wind subsides. Antifreeze will not be required except in extremely cold climates as running water will not freeze. However, where required, antifreeze is added to the water. In addition to anti-freeze, an anti-coagulant is preferably added to the water within the system. Since a small amount of water will be lost, there must be means to replenish the water in the system from time to time. The water is completely recycled, subject only to loss of water through leakage. There are no waste products produced by the plant. When a liquid storage tank has been substantially emptied of water, the air pressure within the tank can be transferred to a tank that has been filled with water to allow the recycled water to refill the emptied tank with as little back pressure as possible.

Since the hydroelectric power plant of the present invention will endure periods of time when either no electrical power or insufficient electrical power is produced, agreements and connections must be sought with existing hydroelectric suppliers so that electricity can be drawn from utility lines when necessary and credit can be received from the supplier for electrical energy added to the utility grid when the electrical power plant of the present invention produces excess power. The electrical transfer switching between the local utility and the electrical power plant of the present invention should be set up to operate automatically with automatic phase locks so that the consumer of the power plant of the present invention will suffer only minimum disruption whether power is supplied from the local utility or from the hydroelectric power plant of the present invention.

Preferably, the control means is a first controller connected to control the transfer of distribution of pressurized air to the storage tanks. A second controller is preferably connected to control the flow of high pressure water from the storage tanks of the turbine. A third controller is preferably connected to control the recycling of water from the water outlet of the turbine to the water inlet of the storage tanks. A fourth controller is preferably connected to control the transfer of electricity from the electrical power outlet of the turbine to the power line. A fifth controller is preferably connected to control the first, second, third and fourth controllers.

The water outlet from the water storage tanks is connected to a collector line containing several valves. The valves are connected to that part of the control means that controls the flow of high pressure water from the storage tanks to the turbine. Preferably, there is an automatic air release in the turbine to release high pressure air when the pressure of the air exceeds a certain maximum. The high pressure air release controls the flow of water into the turbine. Alternatively, the water inlet of the turbine can have an air pressure controller that adds or releases high pressure air in order to control the flow of water into the turbine.

A method of operating a hydroelectric power plant using compressed air obtained from a plurality of windmills connected to compressed air generators uses water storage tanks. The method comprises producing pressurized air when the wind is blowing sufficiently strong to rotate windmills connected to compressed air generators, introducing the pressurized air into a plurality of storage tanks that are nearly filled with water, controlling the flow of water out of the water storage tanks through a water outlet for each of the storage tanks, releasing high pressure water from the water outlets of the water storage tanks into a collector line connected to the water inlet of a turbine, causing the water to flow into the turbine through the water inlet and out of the water outlet from the turbine, thereby generating electricity, recycling the water from the water outlet of the turbine back to the substantially empty storage tanks, supplementing the air pressure within the storage tanks with high pressure air generated by the windmills and causing electricity generated by the turbine to flow into a power line.

The electric power plant of the present invention has a series of valves, air compressors, and vacuum pumps to pump down air pressure of liquid storage tanks that have been emptied of water into a reserve and then to recycle that air with minimum scrubbing and drying.

The hydroelectric power plant of the present invention has great flexibility in relation to size. Also, two or more of the plants, with each plant running one turbine could be erected adjacent to one another. Also, one plant in accordance with the present invention could be designed to operate a plurality of turbines. The hydroelectric plant of the present invention does not produce any waste products and even though the water system will contain some chemical additives, the water system is completely recycled and the environment is therefore protected. While the power produced by a power plant designed in accordance with the present invention will vary with the size of the turbine(s) and the number and size of the windmills etc, it is believed that a plant designed to produce 250,000 kwhrs of electricity will be suitable for many applications. Preferably, the pressure of the air in the reserve air tanks will greatly exceed the air pressure required to force the water through the turbine.

I claim:

1. A hydroelectric power plant comprising a plurality of windmills connected to compressed air generators to provide pressurized air to a set of storage tanks, said compressed air generators each having an air dryer to dry the compressed air produced by the air generator, each storage tank having a high pressure water outlet, a water inlet and an air inlet and air outlet, the water outlet of each storage tank being connected to a water inlet of a turbine that generates electricity when water passes through the turbine, the turbine having a water outlet and an electrical power outlet, the water outlet of the turbine being connected to a recycle line that is in turn connected to the water inlets of the storage tanks, first control means connected to control the transfer and distribution of pressurized air to the storage tanks, to control the flow of high pressure water from the storage tanks to the turbine, and to control the recycling of water from the water outlet of the turbine to the water inlets of the storage tanks, said power plant having a high pressure air reserve system to store high pressure air for use when wind velocieites are not sufficient to operate the plant, said air reserve system having an air inlet and an air outlet, said first control means being connected to control the flow of high pressure air to and from said air reserve system, said electrical power outlet of the turbine being connected to a power line.

2. A hydroelectric power plant as claimed in claim 1 wherein the turbine is a pelton wheel.

3. A hydroelectric power plant as claimed in any one of claims 1 or 2 wherein air pressure on water flowing into the water inlet of the turbine is maintained at a substantially constant level.

4. A hydroelectric power plant as claimed in any one of claims 1 or 2 wherein there are second control means to cause the turbine to rotate at substantially constant speed to produce 60-cycle electricity.

5. A hydroelectric power plant as claimed in claim 1 wherein the control means is a first controller connected to control the transfer and distribution of pressurized air to the storage tanks, a second controller connected to control the flow of high pressure water from the storage tanks to the turbine, a third controller connected to control the recycling of water from the water outlet of the turbine to the water inlet of the storage tanks, a fourth controller connected to control the transfer of electricity from the electrical power outlet of the turbine to the power line and a fifth controller connected to control the first, second, third and fourth controllers.

6. A hydroelectric power plant as claimed in claim 1 wherein there are means to return recycle water from the water outlet of the turbine to the water storage tanks by high pressure air.

7. A hydroelectric power plant as claimed in claim 6, wherein there are means to bleed the high pressure air from the substantially drained water storage tanks before returning the water from the turbine.

8. A hydroelectric power plant as claimed in claim 1 wherein the water outlet from the water storage tank is connected to a collector line containing several valves, said valves being connected to said control means to provide a continuous volume of water to the water inlet of said turbine.

9. A hydroelectric power plant as claimed in claim 1 wherein the water inlet of the turbine has an interior channel shaped in the form of a vortex.

10. A hydroelectric power plant as claimed in claim 1 wherein there is an automatic air release in the turbine to release high pressure air when the pressure of said air exceeds a certain maximum.

11. A hydroelectric as claimed in claim 1 wherein the control means is connected to substantially empty each of the water storage tanks in succession.

12. A hydroelectric power plant as claimed in claim 7 wherein there are means for returning high pressure air to the storage tanks after returning the recycled water.

13. A hydroelectric power plant as claimed in claim 1 wherein there is an air pressure controller on the turbine to add or release high pressure air from the water inlet.

14. A hydroelectric power plant as claimed in claim 1 wherein the high pressure air produced by the air generators has a pressure of approximately 6,000 psi.

15. A hydroelectric power plant as claimed in any one of claims 1 or 2 wherein the power line is connected to a service line of an electrical utility in such a manner that excess electricity can flow from the power line into the service line or electricity can flow from the service line to the power line.

16. A hydroelectric power plant as claimed in any one of claims 1 or 2 wherein the power line is connected to a service line of an electrical utility through an electrical transfer controller to allow electricity to flow from the power line to the service line and from the service line to the power line.

17. A hydroelectric power plant as claimed in any one of claims 1 or 2 wherein there are means to replenish the water within the system.

18. A hydroelectric power plant as claimed in any one of claims 1 or 2 wherein there are no waste products produced by the plant.

19. A hydroelectric power plant as claimed in any one of claims 1 or 2 where the water is completely recycled, subject only to loss of water through leakage.

20. A hydroelectric power plant as claimed in claim 1 wherein flow of water through the turbines is controlled by opening and closing wicket gates.

21. A hydroelectric power plant as claimed in claim 1 wherein the water contains anti coagulant.

22. A hydroelectric power plant as claimed in claim 1 wherein the water contains anti-freeze.

23. A hydroelectric power plant as claimed in claim 1 wherein there are a series of louvres on the turbine.

24. A hydroelectric power plant as claimed in claim 1 wherein said air reserve system is a plurality of reserve air tanks, each having an air inlet and an air outlet.

25. A hydroelectric power plant as claimed in claim 24 wherein the pressure of the high pressure air within the reserve air tanks is substantially greater than the air pressure required to force water through the turbine.

26. A hydroelectric power plant as claimed in claim 7 wherein said means to bleed the air is connected to bleed the air to an air storage tank or to a storage tank that has already been refilled with water.

27. A hydroelectric power plant as claimed in any one of claims 1 or 4 wherein there are means to cause the turbine to rotate at substantially constant speed.

28. A method of operating a hydroelectric power plant using compressed air obtained from a plurality of windmills connected to compressed air generators, said plant having water storage tanks, said compressed air generators each having an air dryer, there being a high pressure air reserve system to store high pressure air for use when wind velocities are not sufficient to operate said plant, said air reserve system having an air inlet and an air outlet, said method comprising producing pressurized air when the wind is blowing sufficiently strong to rotate windmills connected to compressed air generators, drying the compressed air produced by said air generators, introducing the pressurized air into a plurality of storage tanks that are nearly filled with water, controlling the flow of water out of the water storage tanks through a water outlet for each of the storage tanks, releasing high pressure water from the water outlets of the water storage tanks into a collector line connected to the water inlet of a turbine, causing the water to flow into the turbine through the water inlet and out of a water outlet from the turbine, thereby generating electricity, recycling the water from the water outlet of the turbine back to the substantially empty storage tanks, supplementing the air pressure within the storage tanks with high pressure air generated by the windmills, storing excess compressed air produced by the windmills in said high pressure air reserve system, controlling air flowing into and out of said high pressure air reserve system, using air from said high pressure air reserve system to pressurize the water filled storage tanks and wind velocities are not sufficient to operate the plant and causing electricity generated by the turbine to flow into a power line.

29. A method of operating a hydroelectric power plant as claimed in claim 28 including the steps of bleeding the pressurized air to an air storage tank from those storage tanks that have been substantially emptied of water, recycling the water from the water outlet of the turbine back to the substantially empty storage tanks after bleeding the pressurized air from those storage tanks, returning the high pressure air back to the water filled storage tanks, supplementing the air pressure within the storage tanks with high pressure air from the reserve air system or with high pressure air generate by the windmills.

30. A method of operating a hydroelectric power plant as claimed in claim 29 including the step of controlling the air pressure of water flowing in a water inlet of said turbine.

31. A method of operating a hydroelectric power plant as claimed in claim 30 including the steps of operating the turbine at a substantially constant speed and producing 60-cycle electricity from the turbine.

32. A method of operating a hydroelectric power plant as claimed in claim 28 including the step of operating the turbine at a substantially constant speed.

* * * * *